(12) United States Patent
Hiramatsu

(10) Patent No.: US 10,889,166 B2
(45) Date of Patent: Jan. 12, 2021

(54) ROLL SHADE DEVICE

(71) Applicant: AISIN SEIKI KABUSHIKI KAISHA, Kariya (JP)

(72) Inventor: Shinichi Hiramatsu, Chiryu (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 281 days.

(21) Appl. No.: 16/027,955

(22) Filed: Jul. 5, 2018

(65) Prior Publication Data

US 2019/0023109 A1 Jan. 24, 2019

(30) Foreign Application Priority Data

Jul. 18, 2017 (JP) .................................. 2017-139242

(51) Int. Cl.
  *E06B 9/42* (2006.01)
  *B60J 7/00* (2006.01)
  *B60J 1/20* (2006.01)

(52) U.S. Cl.
  CPC ........... *B60J 7/0015* (2013.01); *B60J 1/2033* (2013.01); *E06B 9/42* (2013.01)

(58) Field of Classification Search
  CPC ...... E06B 9/42; E06B 9/58; E06B 9/68; B60J 7/0015; B60J 1/2033; B60J 3/02; B60J 7/043
  See application file for complete search history.

(56) References Cited

U.S. PATENT DOCUMENTS

| | | | |
|---|---|---|---|
| 5,054,533 A * | 10/1991 | Lii | B60J 1/2033 160/23.1 |
| 6,070,641 A * | 6/2000 | Budetti | E06B 9/84 160/302 |
| 2003/0006630 A1* | 1/2003 | Kralik | B60J 7/0015 296/214 |
| 2012/0267465 A1* | 10/2012 | Kitani | B60J 1/2033 242/376 |
| 2014/0014757 A1* | 1/2014 | Wulms | B60J 7/085 242/371 |
| 2018/0134131 A1* | 5/2018 | Kugler | B60J 7/0015 |
| 2018/0162683 A1* | 6/2018 | Munsters | B60J 1/2033 |
| 2019/0225059 A1* | 7/2019 | Hiramatsu | B60J 1/2063 |

FOREIGN PATENT DOCUMENTS

| | | |
|---|---|---|
| DE | 10 2006 046 105 B4 | 4/2008 |
| EP | 2 529 965 B1 | 12/2012 |
| FR | 2 932 123 A1 | 12/2009 |

* cited by examiner

*Primary Examiner* — Beth A Stephan
(74) *Attorney, Agent, or Firm* — Finnegan, Henderson, Farabow, Garrett & Dunner, LLP

(57) ABSTRACT

A roll shade device includes: a fixed shaft fixed to a roof of a vehicle and extending in a vehicle width direction; a flexible rotation shaft into which the fixed shaft is inserted; a light shielding sheet whose first terminal end portion is fixed to the rotation shaft, and which is in an unfolded state where light passing through a light transmitting portion provided to the roof is blocked or is in a winding state where light is allowed to pass; and a torsion spring which is accommodated between the fixed shaft and the rotation shaft, and which biases the rotation shaft in a rotation direction in which the light shielding sheet is wound so that twist of the rotation shaft becomes symmetrical in the vehicle width direction.

18 Claims, 11 Drawing Sheets

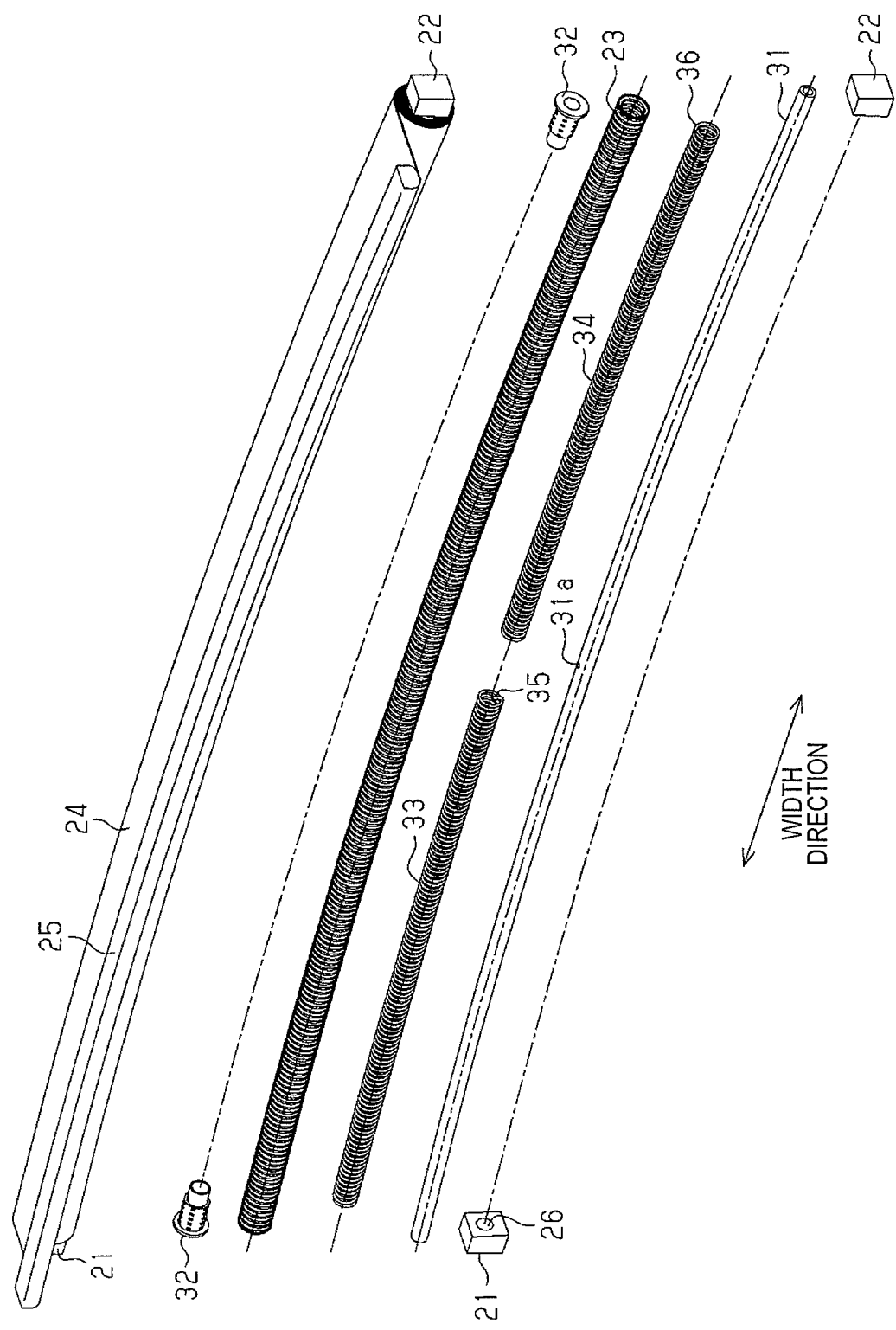

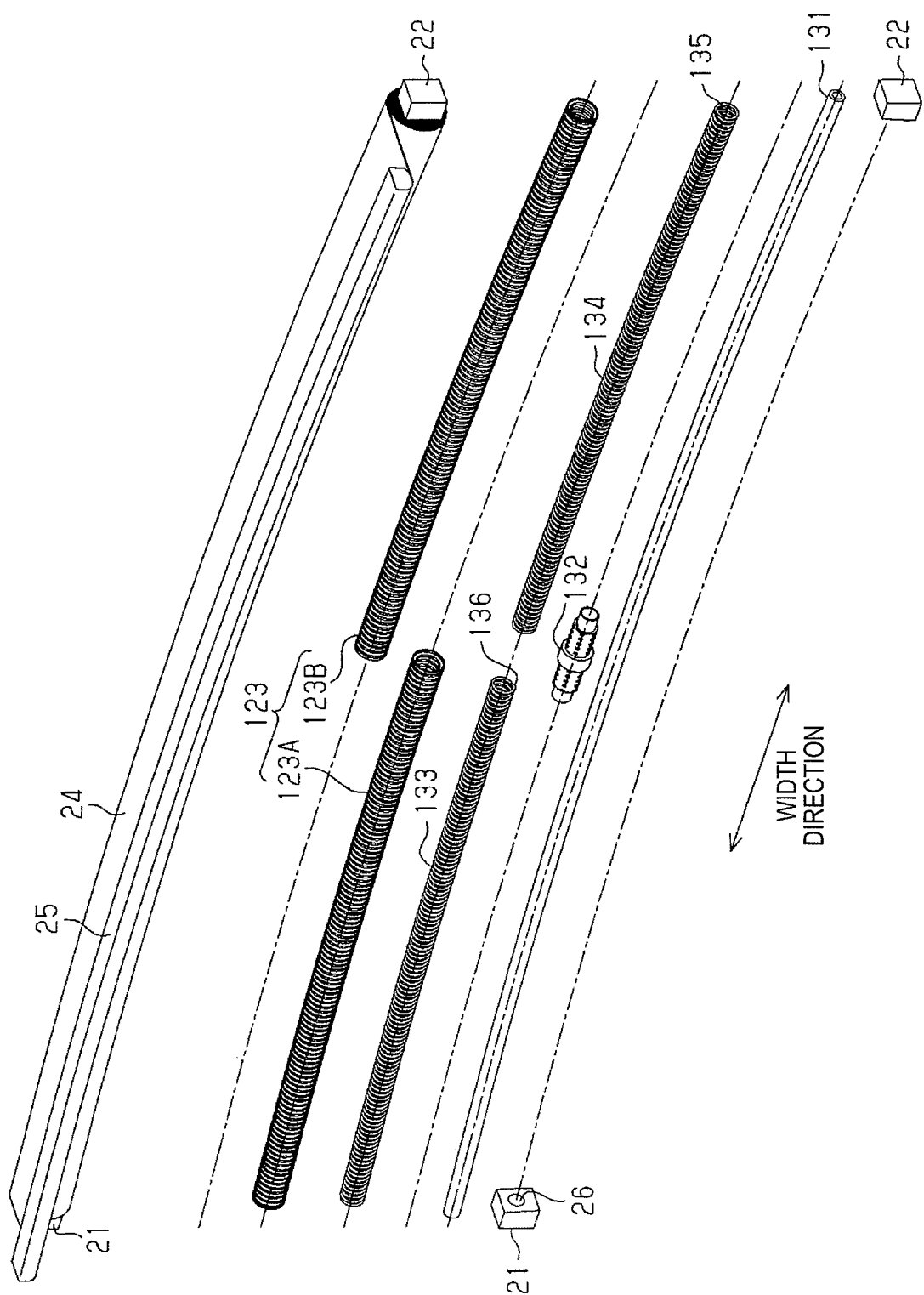

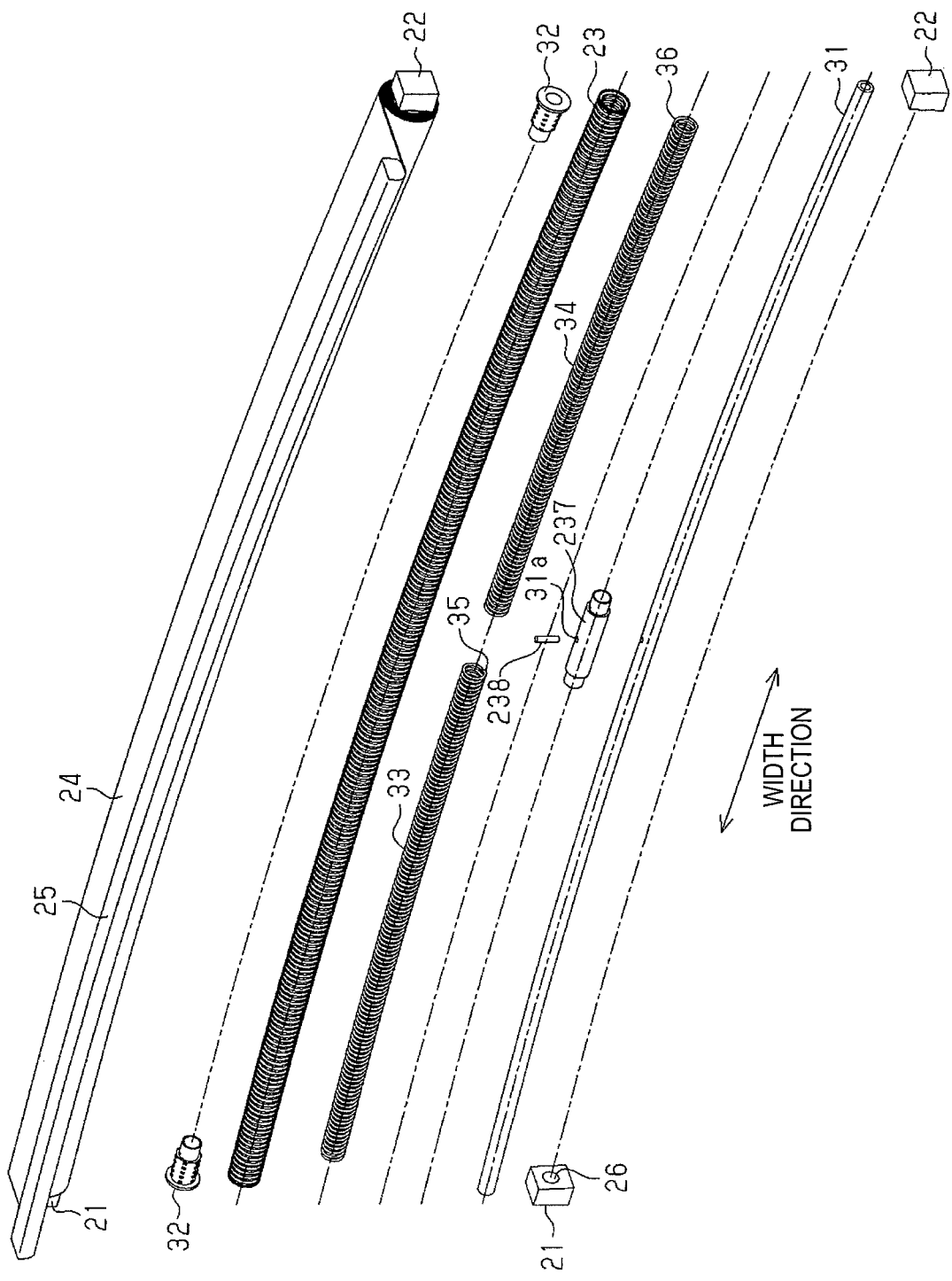

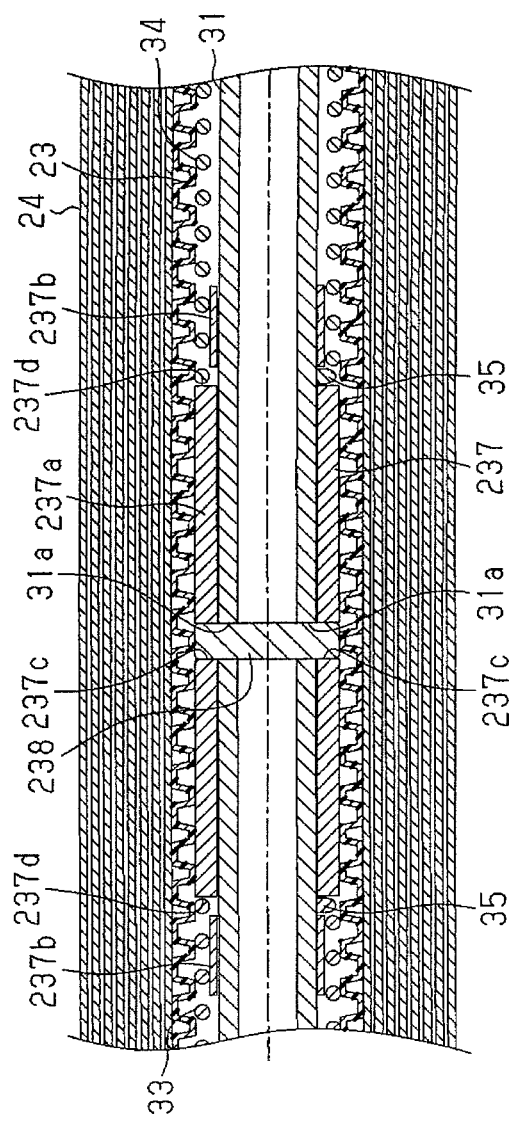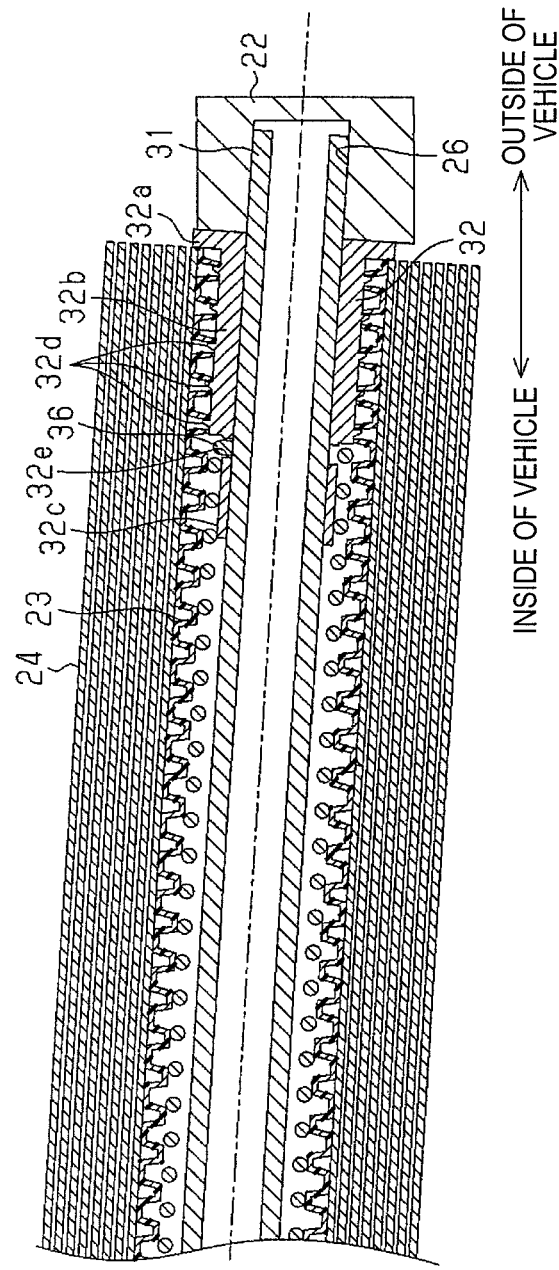
FIG.8A
FIG.8B

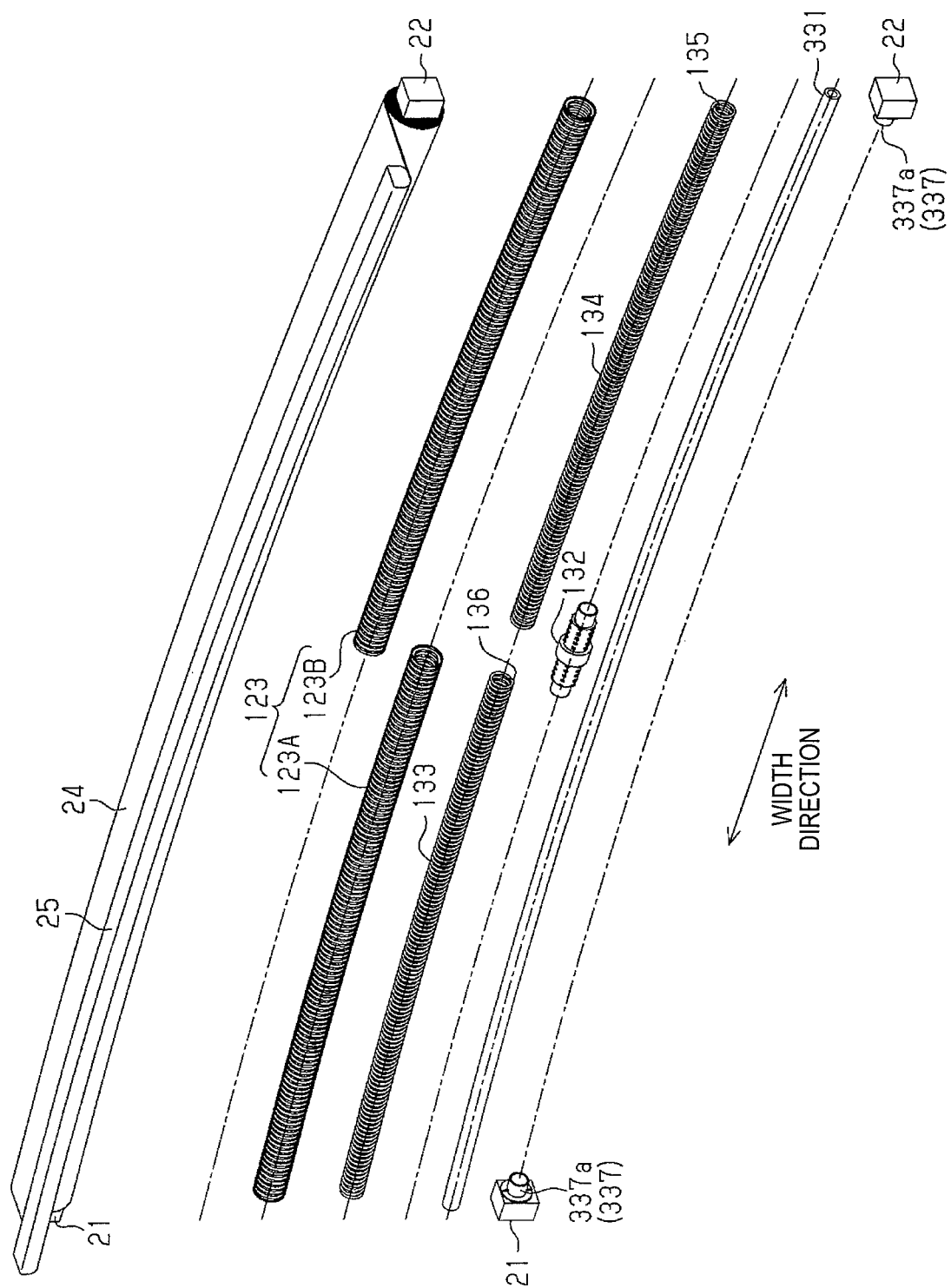

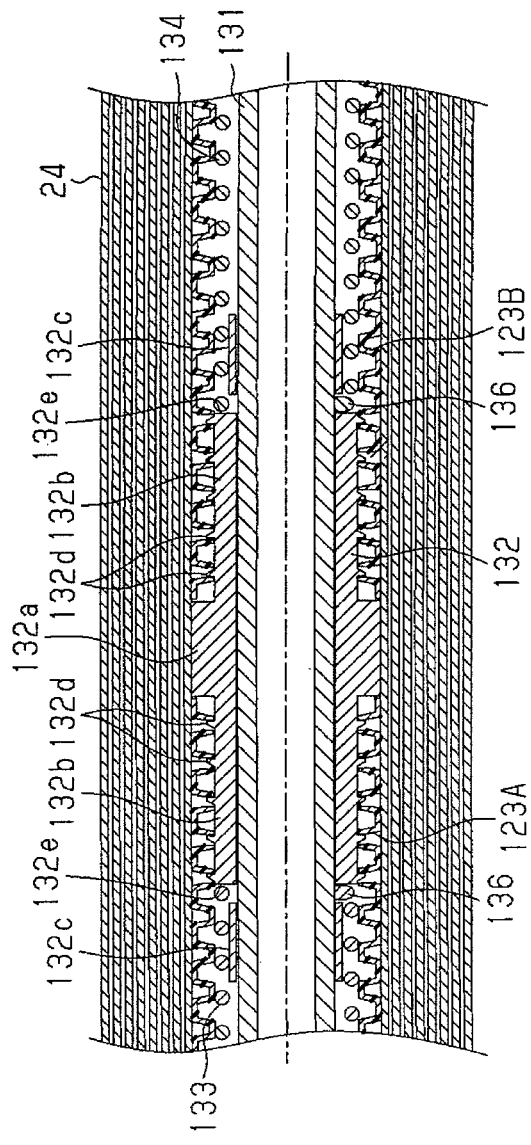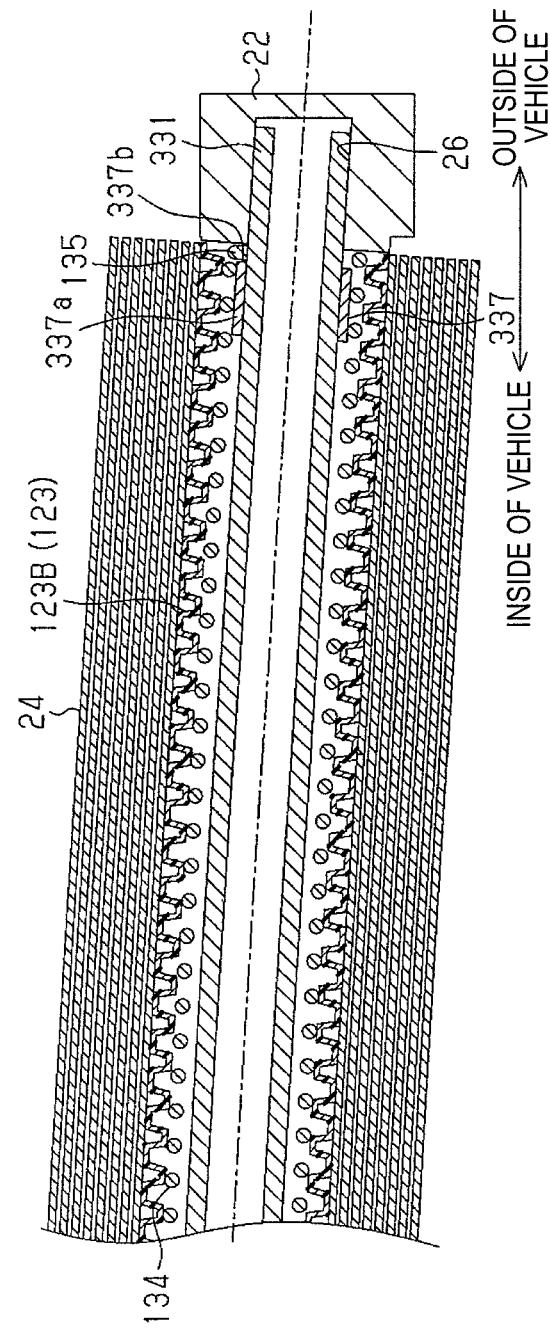

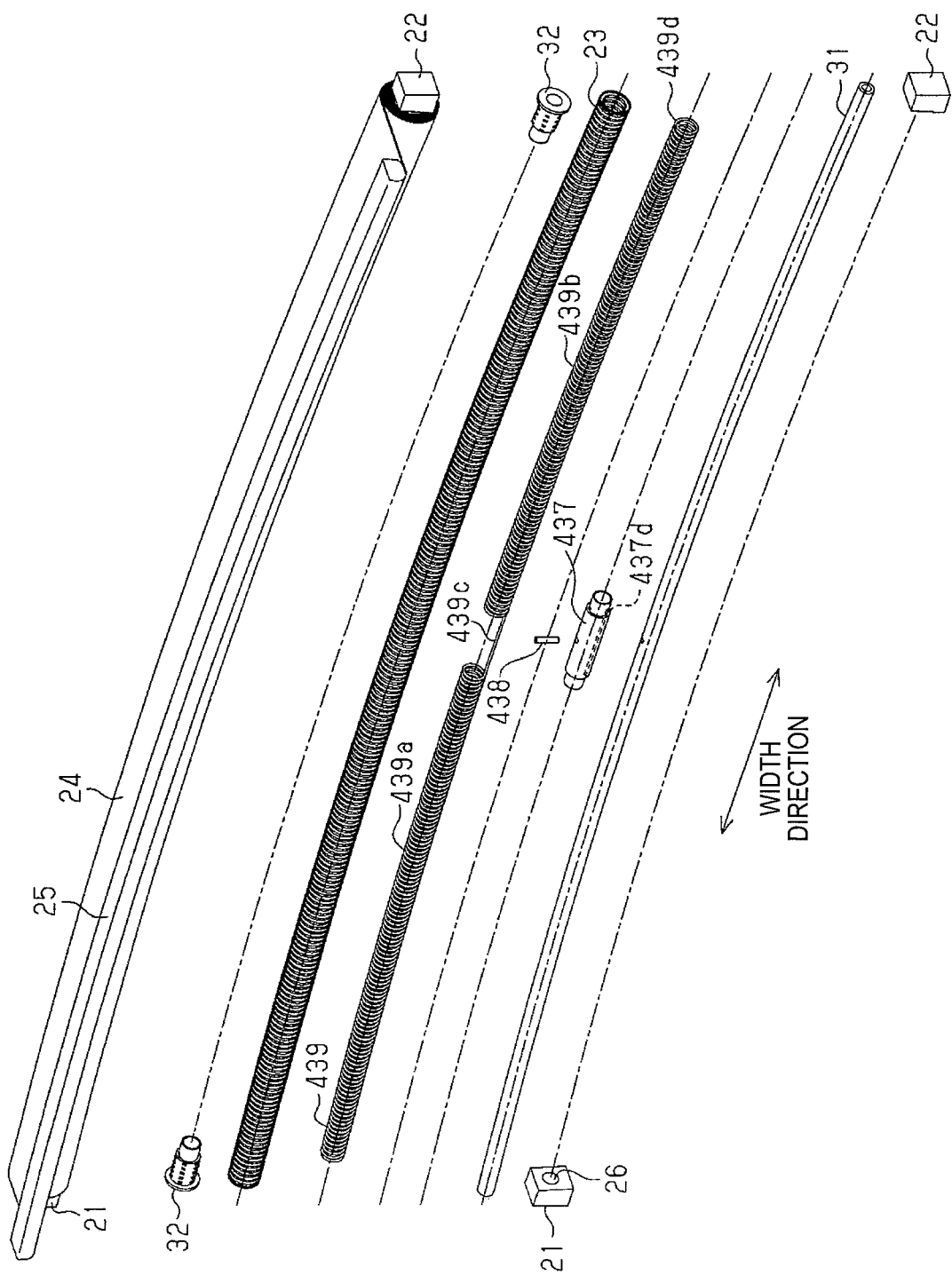

ROLL SHADE DEVICE

CROSS REFERENCE TO RELATED APPLICATIONS

This application is based on and claims priority under 35 U.S.C. § 119 to Japanese Patent Application 2017-139242, filed on Jul. 18, 2017, the entire contents of which are incorporated herein by reference.

TECHNICAL FIELD

This disclosure relates to a roll shade device.

BACKGROUND DISCUSSION

In the related art, various kinds of roll shade devices have been proposed. For example, the roll shade device described in European Patent No. 2 529 965 specification (FIG. 2) (reference 1) includes an arc-shaped fixed shaft which extends in a vehicle width direction, a flexible rotation shaft into which the fixed shaft is inserted, a torsion spring which is accommodated between the fixed shaft and the rotation shaft, and a light shielding sheet whose one terminal end portion is fixed to the rotation shaft. One leg portion of the torsion spring is hooked to the fixed shaft at one end of a fixed shaft in a vehicle width direction, the other leg portion thereof is hooked to the rotation shaft at one end of the rotation shaft in the vehicle width direction (corresponding to far end from leg portion of torsion spring which is hooked to fixed shaft), and thus the torsion spring biases the rotation shaft in a rotation direction in which the light shielding sheet is wound. A spiral spring is attached to each of both ends of the light shielding sheet in the vehicle width direction in a state of being extended. Each end of the light shielding sheet in the vehicle width direction is wound around the rotation shaft by a contracting biasing force of the spiral spring.

In addition, for example, a roll shade device described in German Patent Invention No. 10 2006 046 105 specification (FIGS. 2 to 5) (reference 2) includes an arc-shaped winding shaft which extends in the vehicle width direction, a light shielding sheet in which one terminal end portion thereof is fixed to the winding shaft, a traction bow which is fixed to a terminal end portion on the other side of the light shielding sheet, a drum which is connected to each of both ends of the winding shaft in the vehicle width direction, and a cable which bridges between each of both ends of the traction bow in the vehicle width direction and the drum. The light shielding sheet is wound in a curved state along the arc-shaped winding shaft by rotating the winding shaft together with the drum along with the movement of the traction bow by the cable.

By the way, in reference 1, it is inevitable to make the structure complicated by requiring a biasing force that uses a torsion spring and a spiral spring in combination for winding the light shielding sheet. On the other hand, for example, when attempting to wind up the light shielding sheet only by the biasing force of the torsion spring, a rotational force is generated at one end of the rotation shaft in the vehicle width direction on which the torsion spring is hooked, twist is generated in the flexible rotation shaft. At this time, phase difference of rotation is generated between one end of the rotation shaft in the vehicle width direction which is a side in which the rotation force is generated and the other end of the rotation shaft in the vehicle width direction which is a side to which the rotation force is transmitted (corresponding to end of torsion spring which is closer to leg portion of torsion spring hooked on fixed shaft). In this case, there is a possibility that wrinkles are generated in the light shielding sheet unwound from the rotation shaft, and the appearance is deteriorated. Alternatively, even in a case where the rotation shaft elastically returns to eliminate twist after unwinding of the light shielding sheet, wrinkles may occur in the light shielding sheet and the appearance may deteriorate in a similar manner.

When it is attempted to wind up the light shielding sheet only by the biasing force of the spiral spring, for example, it is difficult to wind the light shielding sheet densely by increasing the biasing force, so that an outer diameter (so-called roll diameter) in a winding state becomes large, which may impair the vehicle mountability.

In addition, in reference 2, since the light shielding sheet is wound by rotation of the winding shaft interlocking with the movement of the traction bow on the premise, it is difficult to wind the light shielding sheet densely, and there is a possibility that the outer diameter in the winding state becomes large and the vehicle mountability is impaired.

Thus, a need exists for a roll shade device which is not susceptible to the drawback mentioned above.

SUMMARY

A roll shade device according to an aspect of this disclosure includes: a fixed shaft which is fixed to a roof of a vehicle and extends in a vehicle width direction; a flexible rotation shaft into which the fixed shaft is inserted; a light shielding sheet whose first terminal end portion as a terminal end portion on one side is fixed to the rotation shaft, and which is in an unfolded state where light passing through a light transmitting portion provided to the roof is blocked or is in a winding state where light is allowed to pass according to movement of a second terminal end portion as a terminal end portion on the other side; and a torsion spring which is accommodated between the fixed shaft and the rotation shaft, which is in one of states including a state where a first leg portion of the torsion spring is hooked to a center of the fixed shaft in the vehicle width direction and a second leg portion of the torsion spring is hooked to a movable side spring holding member which is fixed to a tip end portion of the rotation shaft in the vehicle width direction so that the second leg portion is integrally rotated with the rotation shaft and a state where the first leg portion is hooked to a tip end portion of the fixed shaft in the vehicle width direction and the second leg portion is hooked to the movable side spring holding member fixed to the center of the rotation shaft in the vehicle width direction so as to be integrally rotated with the rotation shaft, and which biases the rotation shaft in a rotation direction in which the light shielding sheet is wound so that twist of the rotation shaft becomes symmetrical in the vehicle width direction.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a perspective view illustrating the roll shade device of the same embodiment in a winding state illustrating structure thereof, and FIG. 3B is an exploded perspective view illustrating the same structure;

FIG. 5A is a perspective view illustrating a roll shade device according to a second embodiment disclosed here in a winding state illustrating its structure, and FIG. 5B is an exploded perspective view illustrating the same structure;

FIG. 7A is a perspective view of a roll shade device according to a third embodiment disclosed here in a winding state illustrating its structure, and FIG. 7B is an exploded perspective view illustrating the same structure;

FIGS. 8A and 8B are longitudinal sectional views illustrating the roll shade device according to the same embodiment in the winding state illustrating the structure of the center and the tip end portion in the vehicle width direction:

FIG. 9A is a perspective view illustrating a roll shade device according to a fourth embodiment disclosed here in a winding state illustrating its structure, and FIG. 9B is an exploded perspective view illustrating the same structure;

FIGS. 10A and 10B are longitudinal sectional views illustrating the roll shade device according to the same embodiment in the winding state illustrating the structure of the center and the tip end portion in the vehicle width direction;

FIG. 11A is a perspective view illustrating a roll shade device according to a fifth embodiment disclosed here in a winding state illustrating its structure, and FIG. 11B is an exploded perspective view illustrating the same structure.

DETAILED DESCRIPTION

First Embodiment

Hereinafter, a first embodiment of the roll shade device will be described. In the following description, a front and rear direction of a vehicle is referred to as "front and rear direction". In addition, an inside in the vehicle width direction toward the vehicle interior is referred to as the "inside of vehicle", and an outside in the vehicle width direction toward the outside of the vehicle is referred to as the "outside of vehicle".

Figure 1:
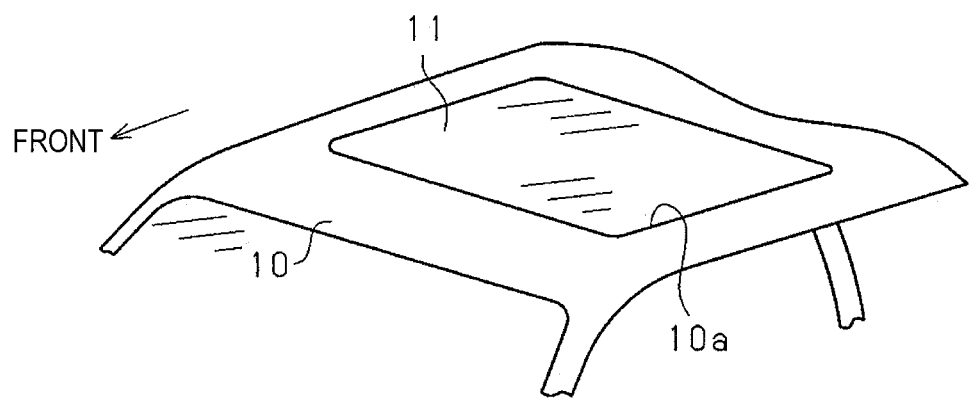
FIG. 1 is a perspective view illustrating a roof to which a first embodiment of a roll shade device is applied.

As illustrated in FIG. 1, a substantially rectangular opening 10a is formed in a roof 10 of a vehicle such as an automobile and a roof panel 11 made of glass or resin as a light transmitting portion is installed in the opening 10a.

Figure 2:
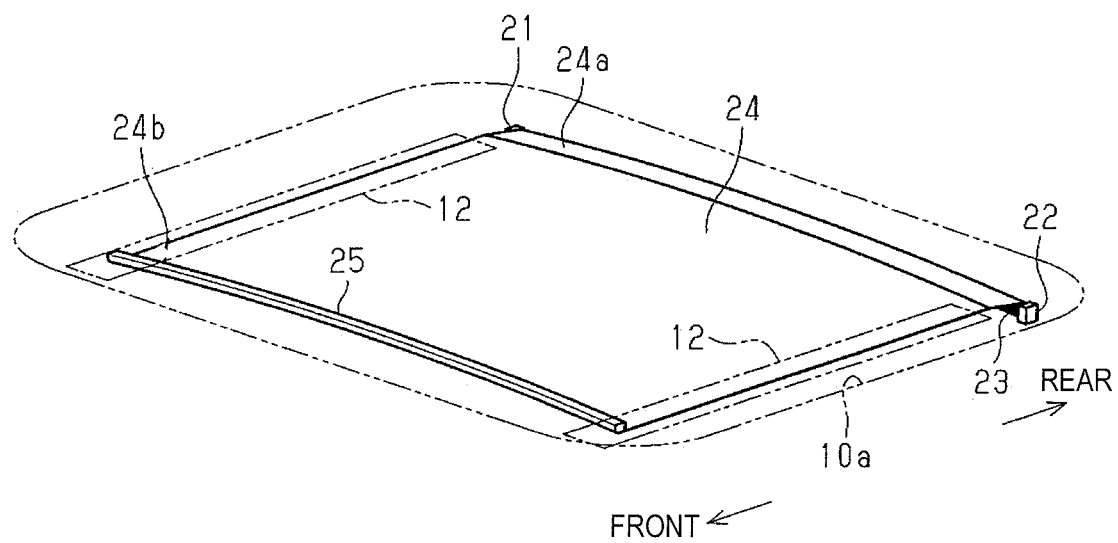
FIG. 2 is a perspective view illustrating the roll shade device of the same embodiment in an unfolded state illustrating structure thereof.
Figure 4A:
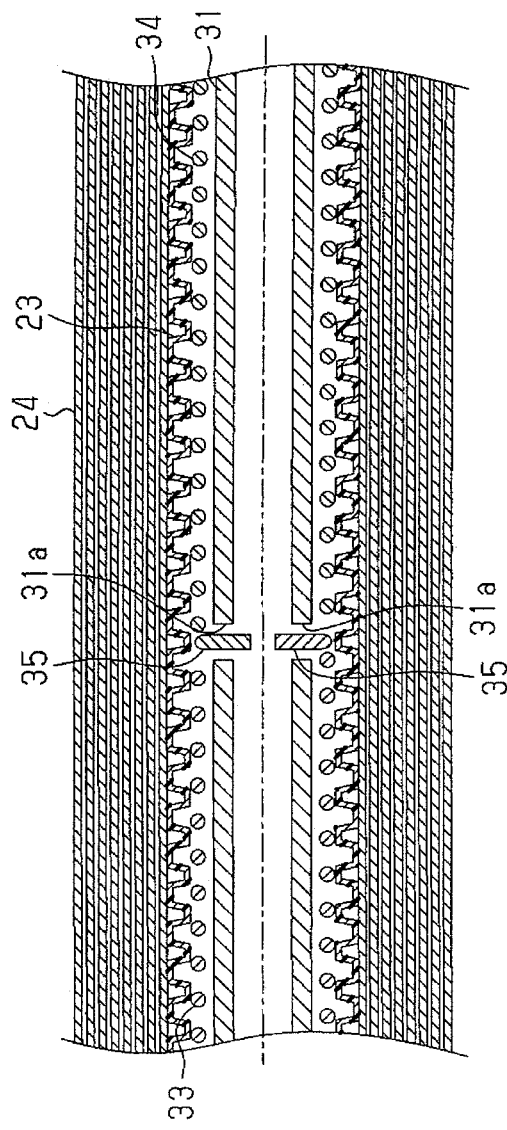
FIGS. 4A and 4B are longitudinal sectional views illustrating the roll shade device according to the same embodiment in a winding state illustrating the structure of the center and the tip end portion in the vehicle width direction.
Figure 4B:
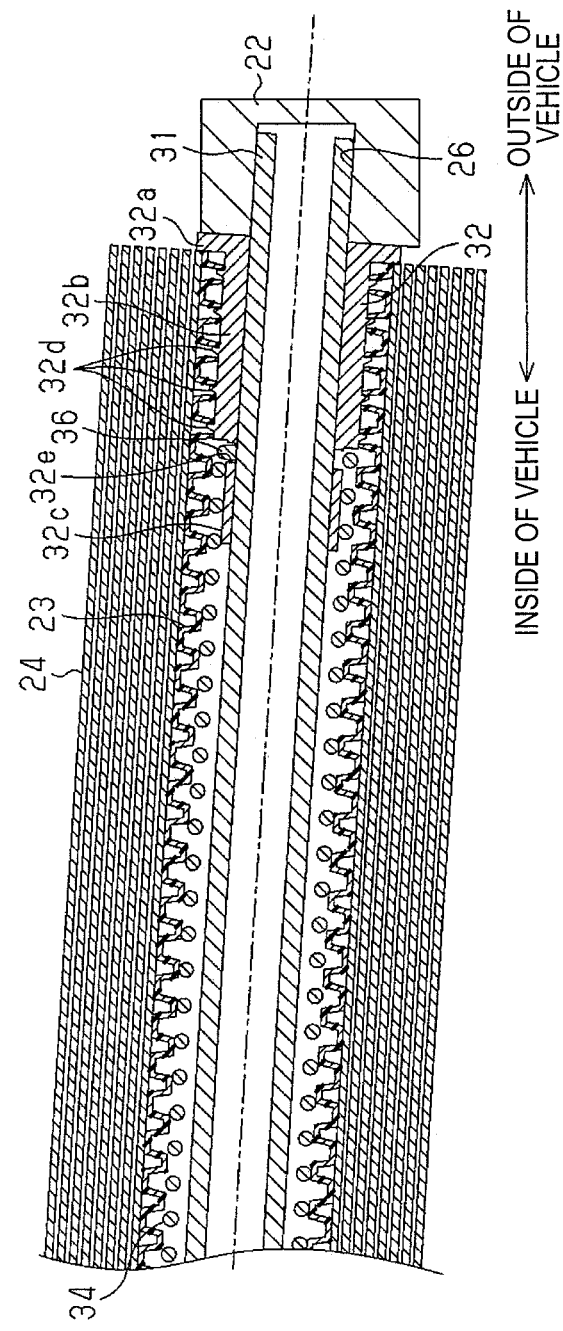
Figure 6A:
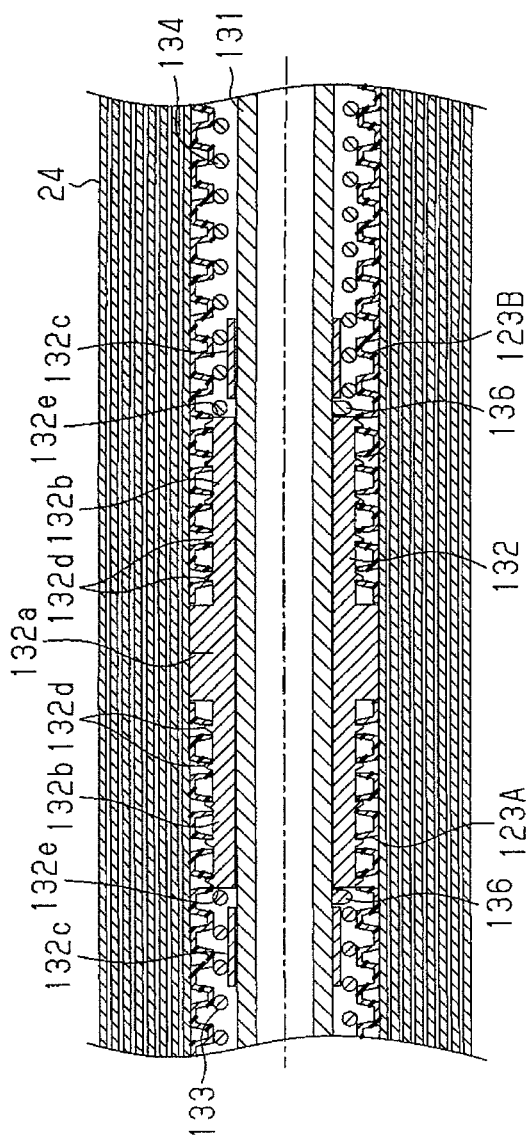
FIGS. 6A and 6B are longitudinal sectional views illustrating the roll shade device according to the same embodiment in the winding state illustrating the structure of the center and the tip end portion in the vehicle width direction.
Figure 6B:
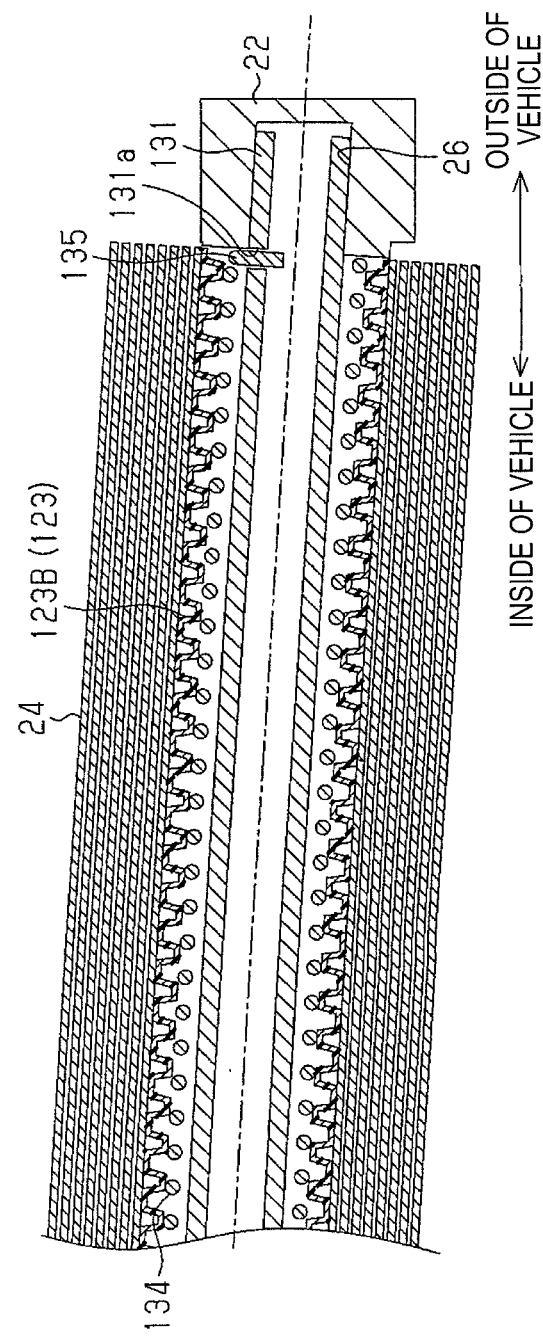
Figure 12A:
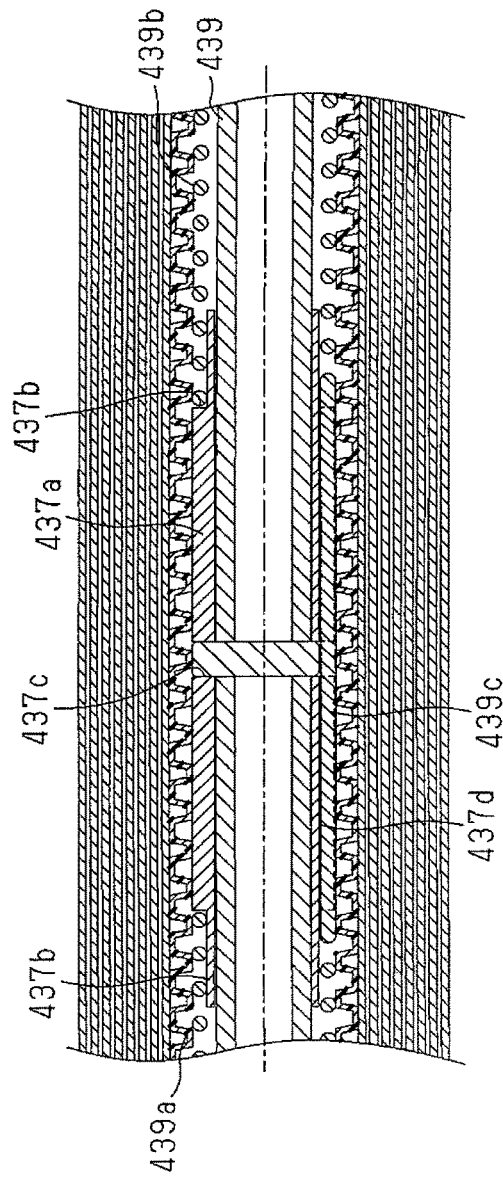
FIGS. 12A and 12B are longitudinal sectional views illustrating the roll shade device according to the same embodiment in the winding state illustrating the structure of the center and the tip end portion in the vehicle width direction.
Figure 12B:
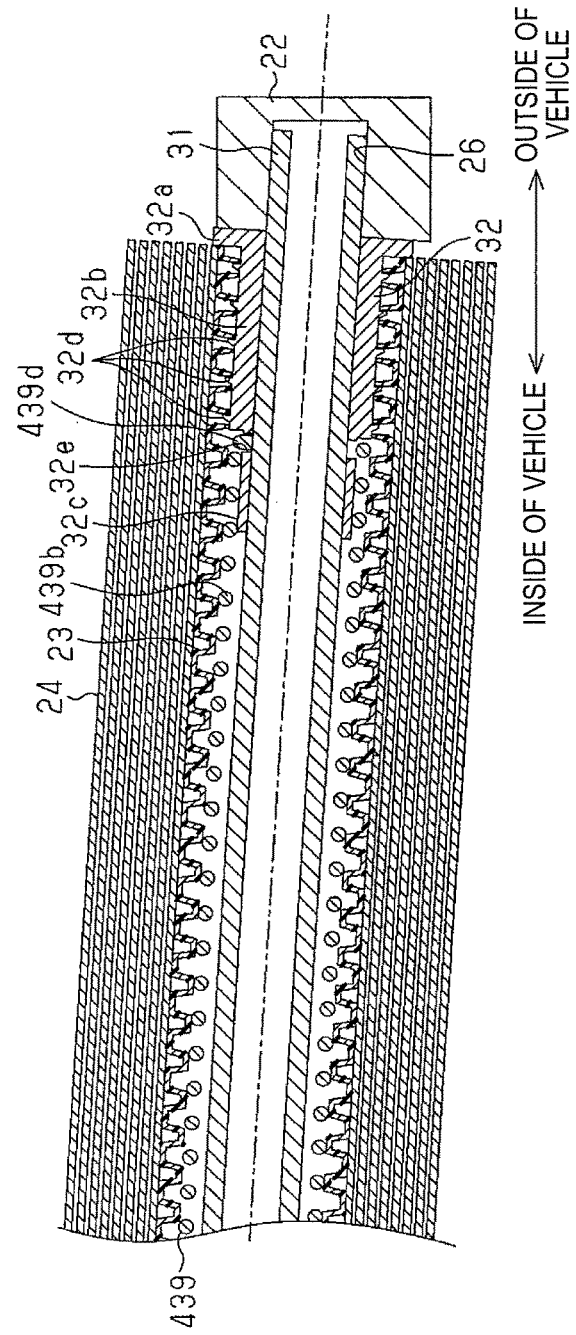

As illustrated in FIG. 2, in the roof 10, a pair of guide rails 12 made of, for example, an extruded material of an aluminum alloy are provided so as to extend in an front and rear direction at both side edge portions of the opening 10a in the vehicle width direction, and a pair of holding blocks 21 and 22 are attached to the rear side of the vehicle of the both guide rails 12. A flexible rotation shaft 23 extending in the vehicle width direction is rotatably connected to both holding blocks 21 and 22. The rotation shaft 23 is made of, for example, a bellows-like cylindrical member (for example, a corrugated tube).

On an outer peripheral portion of the rotation shaft 23, a first terminal end portion 24a, which is a terminal end portion on one side of a substantially cloth-like light shielding sheet 24, is fixed over the entire width direction of the vehicle. The rotation shaft 23 can wind up and unwind the light shielding sheet 24 with rotation. A substantially rod-shaped garnish 25 is fixed to a second terminal end portion 24b which is the other terminal end portion of the light shielding sheet 24 over the entire width direction of the vehicle. The garnish 25 extends in the vehicle width direction and is supported on both guide rails 12 at both end portions so as to be movable in the front and rear direction.

As illustrated in FIGS. 3A and 3B and FIGS. 4A and 4B, a substantially cylindrical fixed shaft 31 made of, for example, a metal material is inserted through the rotation shaft 23. The fixed shaft 31 extends in the vehicle width direction and is formed in a shape of arc protruding upward so that the center is positioned above the both longitudinal tip end portions. A pair of fixing holes 31a which are opposed to each other and open in the radial direction are formed at the center of the fixed shaft 31 in the longitudinal direction.

Each of the both tip end portions of the fixed shaft 31 in the longitudinal direction is inserted into a substantially stepped cylindrical spring holding piece 32 as a movable side spring holding member having an inner diameter equal to the outer diameter of the fixed shaft 31. Accordingly, the spring holding piece 32 opens in a direction heading upward as it goes toward the vehicle interior side following the arc shape of the fixed shaft 31. The spring holding piece 32 has a substantially annular flange 32a protruding outwardly from a tip end protruding to the vehicle outer side than the rotation shaft 23, a substantially cylindrical shaft holding portion 32b connected to the inward side end of the flange 32a in the vehicle, and a substantially cylindrical spring holding portion 32c connected to the inner end of the shaft holding portion 32b in the vehicle.

The outer diameter of the flange 32a is set to be slightly larger than the outer diameter of the rotation shaft 23, and the flange 32a abuts on or approaches the tip end surface of the rotation shaft 23 on the inner-side end surface thereof. The outer diameter of the shaft holding portion 32b is set to be substantially equal to the inner diameter of the rotation shaft 23, and a plurality of substantially stripe-shaped fixing ribs 32d extending in the circumferential direction protrude on the outer peripheral surface thereof. When the shaft holding portion 32b is in a state of being inserted in the tip end portion of the rotation shaft 23, since the plurality of fixing ribs 32d of the spring holding piece 32 are fitted into the rotation shaft 23, the spring holding piece 32 is fixed so as to integrally rotate around the fixed shaft 31 with the rotation shaft 23. The outer diameter of the spring holding portion 32c is set to be smaller than the outer diameter of the shaft holding portion 32b and a spring fixing hole 32e opening radially is formed at a tip end portion adjacent to the shaft holding portion 32b.

Both tip end portions of the fixed shaft 31 protruding toward outside the vehicle from the spring holding piece 32 are supported by both holding blocks 21 and 22 in a non-rotatable manner. In other words, in each of the holding blocks 21 and 22, a substantially circular fixing hole 26 is formed in which the tip end portion of the fixed shaft 31 is inserted in a non-rotatable manner. It goes without saying that the fixing hole 26 opens in a direction heading upwards as it goes toward the vehicle interior following the arc shape of the fixed shaft 31. The fixed shaft 31 is fixed to the roof 10 via the holding blocks 21 and 22. The rotation shaft 23 is rotatably supported by the fixed shaft 31 (holding blocks 21 and 22) via both spring holding pieces 32.

Between the fixed shaft 31 and the rotation shaft 23, a first torsion spring 33 and a second torsion spring 34, which constitute a torsion spring in a state of covering the outer peripheral surface of the fixed shaft 31, are accommodated. The first and second torsion springs 33 and 34 are coil springs whose winding directions are opposite to each other, and the inner diameter and outer diameter of the first and second torsion springs 33 and 34 are set to be equal to the outer diameter of the spring holding portion 32c of the spring holding piece 32 and the inner diameter of the rotation shaft 23, respectively. A first leg portion 35, which is one leg portion of the first and second torsion springs 33 and 34 positioned at the center of the fixed shaft 31 and the like in the vehicle width direction, extends in the radial direction opposed to each other and is inserted into and hooked to the fixing holes 31a of the fixed shaft 31, respectively. In other words, the first leg portions 35 of the first and second torsion springs 33 and 34 are directly hooked to the center of the fixed shaft 31 in the vehicle width direction. In addition, spring holding portions 32c of both spring holding pieces 32 are inserted into the tip end portions of the first and second torsion springs 33 and 34 positioned at the tip end portion of the fixed shaft 31 or the like in the vehicle width direction. The second leg portions 36, which are the other leg portions of the first and second torsion springs 33 and 34 positioned at the tip end portion of the fixed shaft 31 or the like in the vehicle width direction, extends in the radial direction toward the fixed shaft 31 and are respectively inserted and hooked in the spring fixing holes 32e of the both spring holding pieces 32.

The first and second torsion springs 33 and 34 through which the fixed shaft 31 is inserted are curved in a shape of arc protruding upward along the fixed shaft 31 and the rotation shaft 23 which encloses the first and second torsion springs 33 and 34 is curved in a shape of arc protruding upward along the fixed shaft 31.

With such a configuration, when the second terminal end portion 24b of the light shielding sheet 24 moves together with the garnish 25 to the front of the vehicle along the guide rail 12, the light shielding sheet 24 is unwound while the rotation shaft 23 rotates around the fixed shaft 31 in one direction. Accordingly, the light shielding sheet 24 is in an unfolded state (fully closed state) in which the light passing through the roof panel 11 toward the interior of the vehicle is blocked. At this time, the first and second torsion springs 33 and 34 are twisted in opposite directions to each other to generate a biasing force in the rotation direction in which the rotation shaft 23 winds the light shielding sheet 24.

The first and second torsion springs 33 and 34 generate a twist in the flexible rotation shaft 23 along with twists thereof. The twist of the rotation shaft 23 is generated to be symmetrical (symmetrical in the left and right direction) in the vehicle width direction. In other words, the first and second torsion springs 33 and 34 bias the rotation shaft 23 so that the twist of the rotation shaft 23 is symmetrical in the vehicle width direction.

On the other hand, when the second terminal end portion 24b of the light shielding sheet 24 moves together with the garnish 25 to the rear of the vehicle along the guide rail 12, the light shielding sheet 24 is wound up while the rotation shaft 23 rotates in the opposite direction around the fixed shaft 31 by the biasing force of the first and second torsion springs 33 and 34. Accordingly, the light shielding sheet 24 is in the winding state (fully opened state) allowing the passage of light towards the interior of the vehicle.

Next, the effects of the present embodiment will be described together with the operation thereof.

(1) In the present embodiment, the first and second torsion springs 33 and 34 bias the rotation shaft 23 so that the twist of the rotation shaft 23 is symmetrical in the vehicle width direction, whereby there is no phase difference in rotation between both tip end portion of the rotation shaft 23 in the vehicle width direction. Accordingly, it is possible to suppress wrinkles occurring on the light shielding sheet 24 (design surface) in the unfolded state. In addition, since the biasing force of the first and second torsion springs 33 and 34 can be sufficiently secured without taking wrinkles occurring in the light shielding sheet 24 into consideration, it is possible to wind up the light shielding sheet 24 densely, and it is possible to suppress the increase in the outer diameter of the light shielding sheet 24 in the winding state.

(2) In the present embodiment, the fixed shaft 31 is formed in an upwardly protruding arc shape, so that the followability of the roof 10 to a design can be enhanced, and the vehicle mountability of the entire device can be further improved. On the other hand, the rotation shaft 23 can wind and unwind the light shielding sheet 24 by rotating while flexing following the arc-shaped fixed shaft 31.

(3) In the present embodiment, by the biasing force of the first and second torsion springs 33 and 34, at both tip end portions of the rotation shaft 23 in the vehicle width direction on which the second leg portion 36 (the spring holding piece 32) is disposed, the same rotational force is generated. Therefore, although the flexible rotation shaft 23 is twisted, the twist is symmetrical in the vehicle width direction.

In addition, the first leg portions 35 of the first and second torsion springs 33 and 34 are directly hooked to the center of the fixed shaft 31 in the vehicle width direction, so that it is possible to reduce the number of components and the number of assembling steps and thus the cost can be reduced as compared with a case where a holding member (fixed side spring holding member) for hooking the first leg portion 35, for example, is separately fixed to the fixed shaft 31.

Second Embodiment

Hereinafter, a second embodiment of the roll shade device will be described. In the second embodiment, since the holding structure of the torsion spring of the first embodiment is modified, the same reference numerals are given to the same configurations as those of the first embodiment, and a portion of the description thereof will be omitted.

As illustrated in FIGS. 5A and 5B and FIGS. 6A and 6B, a substantially cylindrical fixed shaft 131 made of, for example, a metal material is non-rotatably supported in the holding blocks 21 and 22. In other words, the fixed shaft 131 extends in the vehicle width direction and is formed in a shape of arc protruding upward so that the center is positioned above both longitudinal tip end portions. Both tip end portions of the fixed shaft 131 in the longitudinal direction are non-rotatably inserted into the fixing holes 26 of the holding blocks 21 and 22. A fixed hole 131a that opens in a radial direction is formed at each of both tip end portions of the fixed shaft 131 in the longitudinal direction.

The fixed shaft 131 is inserted into a substantially stepped cylindrical spring holding piece 132 as a movable side spring holding member having an inner diameter equal to the outer diameter thereof. The spring holding piece 132 is disposed at the center of the fixed shaft 131 in the vehicle width direction and opens generally in the vehicle width direction along the arc shape of the fixed shaft 131. This spring holding piece 132 has a substantially annular partition wall 132a disposed at the center of the fixed shaft 131 in the vehicle width direction, has a pair of substantially cylindrical shaft holding portions 132b connected to both ends of the partition wall 132a in the vehicle width direction, and further has a pair of substantially cylindrical spring holding portions 132c connected to the vehicle outer ends of the shaft holding portions 132b thereof.

The outer diameter of the shaft holding portion 132b is set to be smaller than the outer diameter of the partition wall 132a and the outer diameter of the spring holding portion 132c is set to be smaller than the outer diameter of the shaft holding portion 132b. A plurality of substantially stripe-shaped fixing ribs 132d extending in the circumferential direction protrudes on the outer peripheral surface of each shaft holding portion 132b. In addition, a spring fixing hole 132e that opens in a radial direction is formed at a tip end portion adjacent to the shaft holding portion 132b of each spring holding portion 132c.

The fixed shaft 131 inserted into the spring holding piece 132 is inserted through a flexible rotation shaft 123 extending in the vehicle width direction. The rotation shaft 123 includes a first rotation shaft 123A and a second rotation shaft 123B which are disposed symmetrically (symmetrical in the left and right direction) on both sides interposing the partition wall 132a in the vehicle width direction. Each of the first and second rotation shafts 123A and 123B is made of, for example, a bellows-like cylindrical member (for example, a corrugated tube), and the outer diameter and inner diameter thereof are set to be equal to the outer diameter of the partition wall 132a and the outer diameter of the shaft holding portion 132b, respectively.

When the shaft holding portion 132b is in a state of being inserted, by fitting a plurality of fixing ribs 132d, each of the first and second rotation shafts 123A and 123B are fixed so that each of the first and second rotation shafts 123A and 123B rotates integrally with the spring holding piece 132 around the fixed shaft 31. In other words, the first and second rotation shafts 123A and 123B are rotatably supported by the fixed shaft 131 (holding blocks 21 and 22) via the spring holding pieces 132. The tip end surfaces of the first and second rotation shafts 123A and 123B on the vehicle outer side abut against or close to the tip end surfaces of the holding blocks 21 and 22 on the vehicle interior side, respectively. According to the first embodiment, the first terminal end portion 24a of the light shielding sheet 24 is fixed over the entire width direction of the vehicle on the outer peripheral portions of the first and second rotation shafts 123A and 123B including the partition wall 132a.

Between the fixed shaft 131 and the rotation shaft 123 (first and second rotation shafts 123A and 123B), a first torsion spring 133 and a second torsion spring 134 constituting a torsion spring in a state of covering the outer peripheral surface of the fixed shaft 131 are accommodated. The first and second torsion springs 133 and 134 are coil springs whose winding directions are opposite to each other, and the inner diameter and the outer diameter of the first and second torsion springs 133 and 134 are set to be equal to the outer diameter of the spring holding portion 132c of the spring holding piece 132 and the inner diameter of the rotation shaft 123, respectively. The first leg portion 135, which is one leg portion of the first and second torsion springs 133 and 134 positioned at the tip end portion of the fixed shaft 131 or the like in the vehicle width direction, extends in the radial direction toward the fixed shaft 131 and is inserted and hooked into the fixed hole 131a. In other words, the first leg portions 135 of the first and second torsion springs 133 and 134 are directly hooked to the tip end portion of the fixed shaft 131 in the vehicle width direction. In addition, both spring holding portions 132c of the spring holding piece 132 are inserted into the tip end portions of the first and second torsion springs 133 and 134 positioned at the center of the fixed shaft 131 and the like in the vehicle width direction. The second leg portions 136, which is the other leg portions of the first and second torsion springs 133 and 134 positioned at the center of the fixed shaft 131 and the like in the vehicle width direction, extends in the radial direction, and are inserted and hooked in the fixing holes 131a of the fixed shaft 131 respectively.

The first and second torsion springs 133 and 134 through which the fixed shaft 131 is inserted are curved in a shape of arc protruding upward along the fixed shaft 131 and the first and second rotation shafts 123A and 123B enclosing the first and second torsion springs 133 and 134 are curved in a shape of arc protruding upward along the fixed shaft 131.

As described in detail above, according to the present embodiment, in addition to the effects (1) and (2) in the first embodiment, the following effects can be obtained.

(1) In the present embodiment, by the biasing forces of the first and second torsion springs 133 and 134, the same rotational force is transmitted to both tip end portions of the rotation shaft 123 on which the first leg portion 135 is disposed in the vehicle width direction. Therefore, although the flexible rotation shaft 123 is twisted, the twist is symmetrical in the vehicle width direction.

In addition, the first leg portions 135 of the first and second torsion springs 133 and 134 are directly hooked to each tip end portion of the fixed shaft 131 in the vehicle width direction, so that it is possible to reduce the number of components and the number of assembling steps and thus the cost can be reduced as compared with a case where a holding member (fixed side spring holding member) for hooking the first leg portion 135, for example, is separately fixed to the fixed shaft 131.

Third Embodiment

Hereinafter, a third embodiment of the roll shade device will be described. In the third embodiment, since the holding structure of the torsion spring of the first embodiment is modified, the same reference numerals are given to the same configurations as those of the first embodiment, and a portion of the description thereof will be omitted.

As illustrated in FIGS. 7A and 7B and FIGS. 8A and 8B, the fixed shaft 31 is inserted into a substantially stepped cylindrical spring holding piece 237 as a fixed side spring holding member having an inner diameter equal to the outer diameter thereof. This spring holding piece 237 is disposed at the center of the fixed shaft 31 in the vehicle width direction and opens substantially in the vehicle width direction along the arc shape of the fixed shaft 31. The spring holding piece 237 has a substantially cylindrical fixing portion 237a disposed at the center of the fixed shaft 31 in the vehicle width direction and has a pair of substantially cylindrical shapes spring holding portion 237b connected to both ends of the fixing portion 237a in the vehicle width direction.

The outer diameter of the fixing portion 237a is set to be equal to the inner diameter of the rotation shaft 23. A pair of substantially circular fixing holes 237c which are opposed to each other and open in the radial direction are formed at the center of the fixing portion 237a in the vehicle width direction. Each of the fixing holes 237c is disposed concentrically with the fixing hole 31a, and the inner diameter thereof is set to be equal to the inner diameter of the fixing hole 31a. The spring holding piece 237 is fixed to the fixed shaft 31 by fitting both end portions of a substantially columnar rotation preventing pin 238 concentric with both fixing holes 237c into the fixing holes 31a and 237 c.

The outer diameter of the spring holding portion 237b is set to be equal to the inner diameter of the first and second torsion springs 33 and 34. A spring fixing hole 237d that opens in the radial direction is formed at a tip end portion adjacent to the fixing portion 237a of each spring holding portion 237b.

The fixed shaft 31 inserted into the spring holding piece 237 is inserted through the rotation shaft 23. Accordingly, the rotation shaft 23 rotates together with both spring holding pieces 32 around the fixed shaft 31 and the spring holding piece 237.

Between the fixed shaft 31 and the rotation shaft 23, the first and second torsion springs 33 and 34 are accommodated. Both spring holding portions 237b of the spring holding piece 237 are inserted into the tip end portions of the first and second torsion springs 33 and 34 positioned at the center of the fixed shaft 31 and the like in the vehicle width direction. The first leg portions 35 of the first and second torsion springs 33 and 34 positioned at the center of the fixed shaft 31 and the like in the vehicle width direction extend in the radial direction and are inserted into and hooked to both spring fixing holes 237d of the spring holding piece 237 respectively.

As described in detail above, according to the present embodiment, in addition to the effects (1) and (2) in the first embodiment, the following effects can be obtained.

(1) In the present embodiment, by the biasing forces of the first and second torsion springs 33 and 34, the same rotational force is generated at both tip end portions of the rotation shaft 23 in the vehicle width direction on which the second leg portion 36 (spring holding piece 32) is disposed. Therefore, although the flexible rotation shaft 23 is twisted, the twist is symmetrical in the vehicle width direction.

Fourth Embodiment

Hereinafter, a fourth embodiment of the roll shade device will be described. In the fourth embodiment, since the holding structure of the torsion spring of the second embodiment is modified, the same reference numerals are given to the same configurations as those of the second embodiment, and a portion of the description thereof will be omitted.

As illustrated in FIGS. 9A and 9B and FIGS. 10A and 10B, spring holding pieces 337 as fixed side spring holding members are fixed to the holding blocks 21 and 22. The spring holding piece 337 has a substantially cylindrical spring holding portion 337a concentric with the fixing hole 26. The inner diameter and the outer diameter of the spring holding portion 337a are set to be equal to the inner diameter of the fixing hole 26 and the inner diameter of the first torsion spring 133 and the like, respectively. A spring fixing hole 337b that opens in the radial direction is formed at the tip end of each spring holding portion 337a adjacent to the holding blocks 21 and 22.

A substantially cylindrical fixed shaft 331 made of a metal material, for example, is supported in the both holding blocks 21 and 22 together with both spring holding pieces 337 so as to be non-rotatable. In other words, the fixed shaft 331 extends in the vehicle width direction, and is formed in a shape of arc protruding upward so that the center is positioned above both tip end portions in the longitudinal direction. Both tip end portions of the fixed shaft 331 in the longitudinal direction are non-rotatably inserted into the spring holding portions 337a of the spring holding pieces 337 and the fixing holes 26 of both holding blocks 21 and 22.

The fixed shaft 331 is inserted into the spring holding piece 132 according to the fixed shaft 131. The fixed shaft 331 inserted into the spring holding piece 132 is inserted through the rotation shaft 123 (first and second rotation shafts 123A and 123B). Therefore, the rotation shaft 123 rotates around the fixed shaft 331 and the both spring holding pieces 337 together with the spring holding piece 132.

Between the fixed shaft 331 and the rotation shaft 123, the first and second torsion springs 133 and 134 are accommodated. Spring holding portions 337a of both spring holding pieces 337 are inserted into the tip end portions of the first and second torsion springs 133 and 134 positioned at the tip end portion of the fixed shaft 331 and the like in the vehicle width direction. The first leg portions 135 of the first and second torsion springs 133 and 134 positioned at the tip end portion of the fixed shaft 331 or the like in the vehicle width direction extend in the radial direction and are inserted and hooked in the spring fixing holes 337b of both spring holding pieces 337 respectively.

As described in detail above, according to the present embodiment, in addition to the effects (1) and (2) in the first embodiment, the following effects can be obtained.

(1) In the present embodiment, by the biasing forces of the first and second torsion springs 133 and 134, the same rotational force is transmitted to both tip end portions of the rotation shaft 123 on which the first leg portion 135 is disposed in the vehicle width direction. Therefore, although the flexible rotation shaft 123 is twisted, the twist is symmetrical in the vehicle width direction.

Fifth Embodiment

Hereinafter, a fifth embodiment of the roll shade device will be described. In the fifth embodiment, the torsion spring of the third embodiment is modified, the same reference numerals are given to the same configurations as those of the third embodiment, and a portion of the description thereof will be omitted.

As illustrated in FIGS. 11A and 11B and 12A and 12B, the fixed shaft 31 is inserted into a substantially stepped cylindrical spring holding piece 437 as a fixed side spring holding member having an inner diameter equal to the outer diameter thereof. This spring holding piece 437 is disposed at the center in the vehicle width direction of the fixed shaft 31 and opens substantially in the vehicle width direction following the arc shape of the fixed shaft 31. The spring holding piece 437 has a substantially cylindrical fixing portion 437a disposed at the center of the fixed shaft 31 in the vehicle width direction and has a pair of substantially cylindrical spring holding portion 437b connected to both ends of the fixing portion 437a in the vehicle width direction.

The outer diameter of the fixing portion 437a is set to be equal to the inner diameter of the rotation shaft 23. A pair of substantially circular fixing holes 437c which are opposed to each other and open in the radial direction are formed at the center of the fixing portion 437a in the vehicle width direction. Each of both fixing holes 437c is disposed concentrically with the fixing hole 31a, and the inner diameter thereof is set to be equal to the inner diameter of the fixing hole 31a. The spring holding piece 437 is fixed to the fixed shaft 31 by fitting both end portions of a substantially columnar rotation preventing pin 438 concentric with both fixing holes 437c into both fixing holes 31a and 437c. The outer diameter of the spring holding portion 437b is set to be equal to the outer diameter of the spring holding portion 32c of the spring holding piece 32. A spring fixing groove 437d having a substantially U-shaped groove is formed in the lower portion of the outer peripheral portion of the fixing portion 437a over the entire length in the vehicle width direction.

The fixed shaft 31 inserted into the spring holding piece 437 is inserted through the rotation shaft 23. Accordingly, the rotation shaft 23 rotates together with the spring holding pieces 32 around the fixed shaft 31 and the spring holding piece 437.

A torsion spring 439 is accommodated between the fixed shaft 31 and the rotation shaft 23 in a state of covering the outer peripheral surface of the fixed shaft 31. The torsion spring 439 has a first spring portion 439a as a first torsion spring and a second spring portion 439b as a second torsion spring disposed on both sides interposing the fixing portion 437a of the spring holding piece 437 in the vehicle width direction. The first and second spring portions 439a and 439b are coil springs whose winding directions are opposite to each other and the inner diameter and outer diameter of the first and second spring portions 439a and 439b are set to be equal to the outer diameter of the spring holding portion 32c of the spring holding piece 32 and the inner diameter of the rotation shaft 23, respectively.

In addition, the torsion spring 439 has a linear first leg portion 439c that connects the terminal ends of the first and second spring portions 439a and 439b along the spring fixing groove 437d of the spring holding piece 437. In other words, the torsion spring 439 has a structure in which the first and second spring portions 439a and 439b are integrally provided with one wire rod. The torsion spring 439 is fixed to the spring holding piece 437 (fixed shaft 31) by fitting and hooking the first leg portion 439c into the spring fixing groove 437d.

Spring holding portions 32c of the spring holding pieces 32 are inserted into both tip end portions of the torsion spring 439 in the vehicle width direction. A second leg portion 439 d, which is the other leg portion positioned at both tip end portions of the torsion spring 439 in the vehicle width direction, extends in the radial direction toward the fixed shaft 31 and is inserted into and hooked to the spring fixing hole 32e of the spring holding pieces 32 respectively.

The torsion spring 439 through which the fixed shaft 31 is inserted is curved in a shape of arc protruding upward along the fixed shaft 31 and the rotation shaft 23 enclosing the torsion spring 439 is curved in a shape of arc protruding upward along the fixed shaft 31.

As described in detail above, according to the present embodiment, in addition to the effects of the third embodiment, the following effects can be obtained.

(1) In the present embodiment, the number of components can be reduced by integrally providing the first and second spring portions 439a and 439b with one wire rod.

The embodiments described above may be modified as follows.

In the first, second and fourth embodiments, instead of the first torsion springs 33 and 133 and the second torsion springs 34 and 134, a torsion spring may be employed in which the first and second spring portions (439a and 439b) are integrally provided with one wire rod in accordance with the torsion spring 439. By changing in this manner, the number of components can be reduced.

In the second and fourth embodiments, as long as a sufficient biasing force (winding force) is secured, either one of the first torsion spring 33 and the second torsion spring 34 may be omitted. In this case, at the center of the rotation shaft 123 in the vehicle width direction on which the second leg portion 36 (spring holding piece 132) is disposed, a rotational force is generated, by the biasing force of the corresponding first torsion spring 33 or the second torsion spring 34. At this time, a rotational force equivalent to the rotational force transmitted to the tip end portion of the rotation shaft 123, which is the disposition side of the first leg portion 35, in the vehicle width direction is transmitted to the tip end portion of the rotation shaft 123 in the vehicle width direction which is an opposite side to the disposition side of the first leg portion 35. Therefore, although the flexible rotation shaft 123 is twisted, the twist is symmetrical in the vehicle width direction. In addition, since the torsion spring (first torsion spring 33 or second torsion spring 34) exists only on one side in the vehicle width direction, the structure as the entire apparatus can be further simplified.

In the second and fourth embodiments, instead of the first and second rotation shafts 123A and 123B, a rotation shaft which is not divided into two in the vehicle width direction may be adopted according to the rotation shaft 23.

In each of the embodiments described above, the rotation shafts 23 and 123 may be, for example, a water supply hose or the like as long as they have required durability.

In each of the embodiments described above, the arc shape of the fixed shafts 31, 131, and 331 includes an arc shape, a triangular shape, and a trapezoidal shape that protrudes upward so that the center is positioned above both tip end portions in the longitudinal direction.

In each of the embodiments described above, the fixed shafts 31, 131, and 331 may extend straight in the vehicle width direction.

In each of the embodiments described above, the roof panel 11 provided in the opening 10a of the roof 10 adopts a sunroof constituting a light transmitting portion. In this case, the roof panel 11 may be a movable slide panel or a fixed panel. On the other hand, in a sunroof in which the roof as a whole is made of a resin material, a portion of the roof may be used as a light transmitting portion.

In each of the embodiments described above, the "light shielding sheet" includes not only those which shield light by 100% but also those which change the light transmittance.

Next, technical ideas which can be grasped from the embodiments described above and another example will be additionally described below.

(A) In the roll shade device, the movable side spring holding member is disposed at the center of the rotation shaft in the vehicle width direction, and, the first leg portion of the torsion spring is directly hooked to the tip end portion of the fixed shaft in the vehicle width direction and the second leg portion thereof is hooked to the movable side spring holding member.

According to this configuration, by the biasing force of the torsion spring, a rotational force is generated at the center of the rotation shaft in the vehicle width direction, on which the second leg portion (movable side spring holding member) is disposed. At this time, a rotational force equivalent to the rotational force transmitted to the tip end portion of the rotation shaft in the vehicle width direction, which is the disposition side of the first leg portion is transmitted to the tip end portion of the rotation shaft in the vehicle width direction, which is a side opposite to the disposition side of the first leg portion. Therefore, although the flexible rotation shaft is twisted, the twist is symmetrical in the vehicle width direction.

In addition, the first leg portions of the torsion springs are directly hooked to the tip end portion of the fixed shaft in the vehicle width direction, so that it is possible to reduce the number of components and the number of assembling steps and thus the cost can be reduced as compared with a case where a holding member (fixed side spring holding member) for hooking the first leg portion, for example, is separately fixed to the fixed shaft. In addition, since the torsion spring exists only on one side in the vehicle width direction, the structure as the entire apparatus can be further simplified.

(B) In the roll shade device, including: a fixed side spring holding member fixed to a tip end portion in the vehicle width direction of the fixed shaft, in which the movable side spring holding member is disposed at the center of the rotation shaft in the vehicle width direction, and the first leg portion of the torsion spring is hooked to the fixed side spring holding member and the second leg portion thereof is hooked to the movable side spring holding member.

According to this configuration, by the biasing force of the torsion spring, a rotational force is generated at the center of the rotation shaft in the vehicle width direction, on which the second leg portion (movable side spring holding member) is disposed. At this time, a rotational force equivalent to the rotational force transmitted to the tip end portion of the rotation shaft in the vehicle width direction, which is the disposition side of the first leg portion is transmitted to the tip end portion of the rotation shaft in the vehicle width direction, which is a side opposite to the disposition side of the first leg portion. Therefore, although the flexible rotation shaft is twisted, the twist is symmetrical in the vehicle width direction.

In addition, since the torsion spring exists only on one side in the vehicle width direction, the structure of the entire apparatus can be further simplified.

A roll shade device according to an aspect of this disclosure includes: a fixed shaft which is fixed to a roof of a vehicle and extends in a vehicle width direction; a flexible rotation shaft into which the fixed shaft is inserted; a light shielding sheet whose first terminal end portion as a terminal end portion on one side is fixed to the rotation shaft, and which is in an unfolded state where light passing through a light transmitting portion provided to the roof is blocked or is in a winding state where light is allowed to pass according to movement of a second terminal end portion as a terminal end portion on the other side; and a torsion spring which is accommodated between the fixed shaft and the rotation shaft, which is in one of states including a state where a first leg portion of the torsion spring is hooked to a center of the fixed shaft in the vehicle width direction and a second leg portion of the torsion spring is hooked to a movable side spring holding member which is fixed to a tip end portion of the rotation shaft in the vehicle width direction so that the second leg portion is integrally rotated with the rotation shaft and a state where the first leg portion is hooked to a tip end portion of the fixed shaft in the vehicle width direction and the second leg portion is hooked to the movable side spring holding member fixed to the center of the rotation shaft in the vehicle width direction so as to be integrally rotated with the rotation shaft, and which biases the rotation shaft in a rotation direction in which the light shielding sheet is wound so that twist of the rotation shaft becomes symmetrical in the vehicle width direction According to this configuration, the torsion spring biases the rotation shaft so that the twist of the rotation shaft is symmetrical in the vehicle width direction, so that there is no phase difference in rotation between the both tip end portions of the rotation shaft in the vehicle width direction. Accordingly, it is possible to suppress wrinkles occurring in the light shielding sheet in the unfolded state. In addition, since the biasing force of the torsion spring can be sufficiently secured without considering wrinkles occurring in the light shielding sheet, it is possible to wind up the light shielding sheet densely, and it is possible to suppress the increase in the outer diameter of the light shielding sheet which is in the winding state.

In the roll shade device according to the aspect of this disclosure, it is preferable that the fixed shaft is formed in a shape of an arc protruding upward.

According to this configuration, since the fixed shaft is formed in an upwardly convex arc shape, the followability of the roof to the design can be enhanced, and the vehicle mountability of the entire apparatus can be further improved. On the other hand, the rotation shaft rotates while flexing following the arc-shaped fixed shaft, so that the light shielding sheet can be wound up and unwound.

In the roll shade device according to the aspect of this disclosure, it is preferable that a pair of the movable side spring holding members are disposed at both tip end portions of the rotation shaft in the vehicle width direction, and the torsion spring is configured with a first torsion spring and a second torsion spring in which winding directions thereof are opposite to each other, and, in each of the first and the second torsion springs, the first leg portion is directly hooked to the center of the fixed shaft in the vehicle width direction and the second leg portion is hooked to each of the movable side spring holding members.

According to this configuration, by the biasing force of the first and second torsion springs, at both tip end portions of the rotation shaft on which the second leg portion (movable side spring holding member) is disposed in the vehicle width direction, equivalent rotational force is generated. Therefore, although the flexible rotation shaft is twisted, the twist is symmetrical in the vehicle width direction.

In addition, since each of the first leg portion of the first and second torsion springs is directly hooked to the center of the fixed shaft in the vehicle width direction, it is possible to reduce the number of components and the number of assembling steps compared to a case where the holding member (fixed side spring holding member) for hooking the first leg portion is separately fixed to the fixed shaft.

In the roll shade device according to the aspect of this disclosure, it is preferable that the movable side spring holding member is disposed at the center of the rotation shaft in the vehicle width direction, the torsion spring is configured with a first torsion spring and a second torsion spring in which the winding directions thereof are opposite to each other, and in each of the first and second torsion springs, the first leg portion is directly hooked to each of both tip end portions of the fixed shaft in the vehicle width direction and the second leg portion is hooked to the movable side spring holding member.

According to this configuration, by the biasing force of the first and second torsion springs, equivalent rotational force is transmitted to both tip end portions of the rotation shaft in the vehicle width direction on which the first leg portion is disposed. Therefore, although the flexible rotation shaft is twisted, the twist is symmetrical in the vehicle width direction.

In addition, since the first leg portion of each of the first and second torsion springs is directly hooked to the respective tip end portions of the fixed shaft in the vehicle width direction, for example, it is possible to reduce the number of components and the number of assembling steps compared to a case where the holding member (fixed side spring holding member) for hooking the first leg portion is separately fixed to the fixed shaft.

It is preferable that the roll shade device further includes a fixed side spring holding member which is fixed to the center of the fixed shaft in the vehicle width direction, a pair of the movable side spring holding members are disposed at both tip end portions of the rotation shaft in the vehicle width direction, the torsion spring is configured with a first torsion spring and a second torsion spring in which winding directions thereof are opposite to each other, and, in each of the first and the second torsion springs, the first leg portion is hooked to the fixed side spring holding member and the second leg portion is hooked to the movable side spring holding member.

According to this configuration, by the biasing force of the first and second torsion springs, at both tip end portions of the rotation shaft on which the second leg portion (movable side spring holding member) is disposed in the vehicle width direction, equivalent rotational force is generated. Therefore, although the flexible rotation shaft is twisted, the twist is symmetrical in the vehicle width direction.

It is preferable that the roll shade device further includes a pair of fixed side spring holding members which is fixed to both tip end portions of the fixed shaft in the vehicle width direction, the movable side spring holding member is disposed on the center of the rotation shaft in the vehicle width direction, the torsion spring is configured with a first torsion spring and a second torsion spring whose winding directions are opposite to each other, and, in each of the first and second torsion springs, the first leg portion is hooked to one of the fixed side spring holding member and the second leg portion is hooked to the movable side spring holding member.

According to this configuration, by the biasing forces of the first and second torsion springs, at the both tip end portions of the rotation shaft in the vehicle width direction on which the first leg portion (fixed side spring holding member) is disposed, equivalent rotational force is transmitted. Therefore, although the flexible rotation shaft is twisted, the twist is symmetrical in the vehicle width direction.

In the roll shade device, it is preferable that the first and second torsion springs are integrally provided with one wire rod.

According to this configuration, since the first and second torsion springs are integrally provided with one wire rod, the number of components can be reduced.

This disclosure has an advantage that wrinkles occurring in a light shielding sheet in an unfolded state can be suppressed and an increase in the outer diameter of the light shielding sheet in a winding state can be suppressed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roll shade device comprising:
   a fixed shaft which is fixed to a roof of a vehicle and extends in a vehicle width direction;
   a flexible rotation shaft into which the fixed shaft is inserted;
   a light shielding sheet whose first terminal end portion as a terminal end portion on one side is fixed to the rotation shaft, and which is in an unfolded state where light passing through a light transmitting portion provided to the roof is blocked or is in a winding state where light is allowed to pass according to movement of a second terminal end portion as a terminal end portion on an other side; and
   a torsion spring which is accommodated between the fixed shaft and the rotation shaft, which is in one of states including a state where a first leg portion of the torsion spring is hooked to a center of the fixed shaft in the vehicle width direction and a second leg portion of the torsion spring is hooked to a movable side spring holding member which is fixed to a tip end portion of the rotation shaft in the vehicle width direction so that the second leg portion is integrally rotated with the rotation shaft and a state where the first leg portion is hooked to a tip end portion of the fixed shaft in the vehicle width direction and the second leg portion is hooked to the movable side spring holding member fixed to a center of the rotation shaft in the vehicle width direction so as to be integrally rotated with the rotation shaft, and which biases the rotation shaft in a rotation direction in which the light shielding sheet is wound so that twist of the rotation shaft becomes symmetrical in the vehicle width direction.

2. The roll shade device according to claim 1,
   wherein the fixed shaft is formed in a shape of an arc protruding upward.

3. The roll shade device according to claim 1,
   wherein a pair of the movable side spring holding members are disposed at both tip end portions of the rotation shaft in the vehicle width direction,
   the torsion spring is configured with a first torsion spring and a second torsion spring in which winding directions thereof are opposite to each other, and
   in each of the first and the second torsion springs, the first leg portion is directly hooked to the center of the fixed shaft in the vehicle width direction and the second leg portion is hooked to each of the movable side spring holding members.

4. The roll shade device according to claim 2,
   wherein a pair of the movable side spring holding members are disposed at both tip end portions of the rotation shaft in the vehicle width direction,
   the torsion spring is configured with a first torsion spring and a second torsion spring in which winding directions thereof are opposite to each other, and
   in each of the first and the second torsion springs, the first leg portion is directly hooked to the center of the fixed shaft in the vehicle width direction and the second leg portion is hooked to each of the movable side spring holding members.

5. The roll shade device according to claim 1,
   wherein the movable side spring holding member is disposed at the center of the rotation shaft in the vehicle width direction, the torsion spring is configured with a first torsion spring and a second torsion spring in which the winding directions thereof are opposite to each other, and in each of the first and second torsion springs, the first leg portion is directly hooked to each of both tip end portions of the fixed shaft in the vehicle width direction and the second leg portion is hooked to the movable side spring holding member.

6. The roll shade device according to claim 2, wherein the movable side spring holding member is disposed at the center of the rotation shaft in the vehicle width direction, the torsion spring is configured with a first torsion spring and a second torsion spring in which the winding directions thereof are opposite to each other, and in each of the first and second torsion springs, the first leg portion is directly hooked to each of both tip end portions of the fixed shaft in the vehicle width direction and the second leg portion is hooked to the movable side spring holding member.

7. The roll shade device according to claim 1, further comprising:

a fixed side spring holding member which is fixed to the center of the fixed shaft in the vehicle width direction, wherein a pair of the movable side spring holding members are disposed at both tip end portions of the rotation shaft in the vehicle width direction, the torsion spring is configured with a first torsion spring and a second torsion spring in which winding directions thereof are opposite to each other, and in each of the first and the second torsion springs, the first leg portion is hooked to the fixed side spring holding member and the second leg portion is hooked to the movable side spring holding member.

8. The roll shade device according to claim 2, further comprising:

a fixed side spring holding member which is fixed to the center of the fixed shaft in the vehicle width direction, wherein a pair of the movable side spring holding members are disposed at both tip end portions of the rotation shaft in the vehicle width direction, the torsion spring is configured with a first torsion spring and a second torsion spring in which winding directions thereof are opposite to each other, and in each of the first and the second torsion springs, the first leg portion is hooked to the fixed side spring holding member and the second leg portion is hooked to the movable side spring holding member.

9. The roll shade device according to claim 1, further comprising:

a pair of fixed side spring holding members fixed to both tip end portions of the fixed shaft in the vehicle width direction, wherein the movable side spring holding member is disposed on the center of the rotation shaft in the vehicle width direction, the torsion spring is configured with a first torsion spring and a second torsion spring whose winding directions are opposite to each other, and in each of the first and second torsion springs, the first leg portion is hooked to one of the fixed side spring holding member and the second leg portion is hooked to the movable side spring holding member.

10. The roll shade device according to claim 2, further comprising:

a pair of fixed side spring holding members fixed to both tip end portions of the fixed shaft in the vehicle width direction, wherein the movable side spring holding member is disposed on the center of the rotation shaft in the vehicle width direction, the torsion spring is configured with a first torsion spring and a second torsion spring whose winding directions are opposite to each other, and in each of the first and second torsion springs, the first leg portion is hooked to one of the fixed side spring holding member and the second leg portion is hooked to the movable side spring holding member.

11. The roll shade device according to claim 3, wherein the first and second torsion springs are integrally provided with one wire rod.

12. The roll shade device according to claim 4, wherein the first and second torsion springs are integrally provided with one wire rod.

13. The roll shade device according to claim 5, wherein the first and second torsion springs are integrally provided with one wire rod.

14. The roll shade device according to claim 6, wherein the first and second torsion springs are integrally provided with one wire rod.

15. The roll shade device according to claim 7, wherein the first and second torsion springs are integrally provided with one wire rod.

16. The roll shade device according to claim 8, wherein the first and second torsion springs are integrally provided with one wire rod.

17. The roll shade device according to claim 9, wherein the first and second torsion springs are integrally provided with one wire rod.

18. The roll shade device according to claim 10, wherein the first and second torsion springs are integrally provided with one wire rod.

* * * * *